Oct. 17, 1950     S. J. ERLING     2,526,212
VACUUM MILKING SYSTEM
Filed April 10, 1947
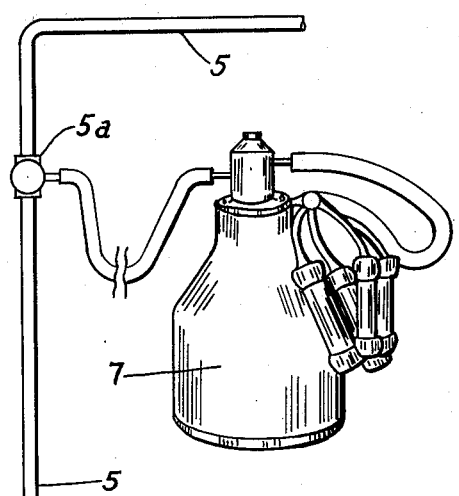
FIG. 1
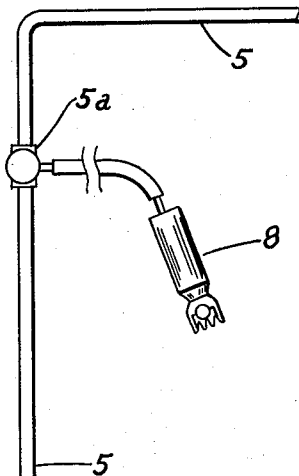
FIG. 2
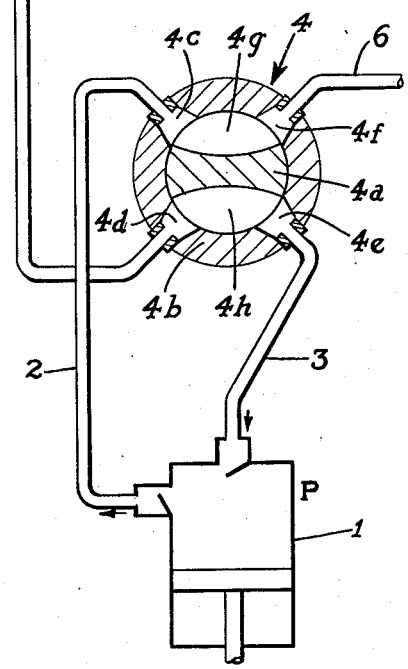
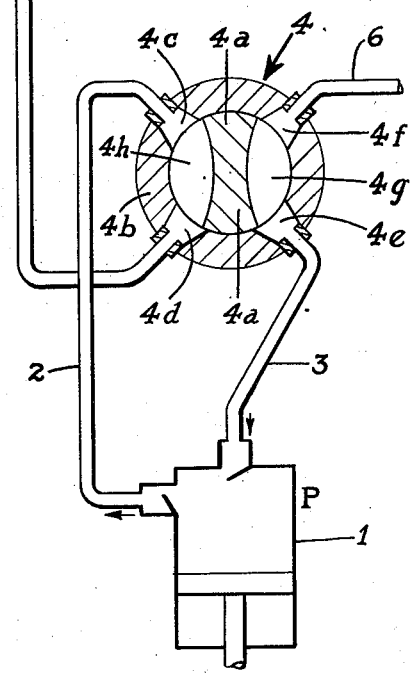
INVENTOR
Sven Johan Erling
BY
Davis, Hoxie & Faithfull
ATTORNEYS Patented Oct. 17, 1950

2,526,212

UNITED STATES PATENT OFFICE 2,526,212

VACUUM MILKING SYSTEM

Sven Johan Erling, Nockeby, Sweden, assignor to Aktiebolaget Separator, Stockholm, Sweden, a corporation of Sweden Application April 10, 1947, Serial No. 740,567
In Sweden May 10, 1946

1 Claim. (Cl. 119—83)

This invention relates to vacuum milking systems and has particular reference to a novel arrangement by which the pneumatic pipe line of the system may be used to supply either sub-atmospheric pressure for operating the milking units or super-atmospheric pressure for operating a different apparatus, without requiring a pumping means other than the usual vacuum pump of the milking installation.

Pneumatic milking units are generally operated from a sub-atmospheric pressure line ("vacuum" line). The milking system, therefore, includes a vacuum pump which, when it is driven, draws air from the pipe line to which the milking units are connected, so as to provide in the pipe line the degree of vacuum necessary to operate the units.

Where these milking systems are used, it is frequently desired to operate pneumatic machines other than the milking units, for example, currying apparatus. However, some types of pneumatic machines are operable only by super-atmospheric pressure, so that the usual vacuum line would not be suitable for such machines.

The present invention is directed to the provision of a vacuum milking system in which the vacuum pipe line may also be used to supply super-atmospheric pressure to apparatus other than the milker units, the system being easily adjustable for either vacuum or super-atmospheric operation from a single pump.

According to the invention, the milking operation is performed with the air inlet to the vacuum pump connected to the pipe line of the milking system while the pump outlet is connected to atmosphere, and the currying or other operation requiring super-atmospheric pressure is performed with the pump inlet connected to atmosphere while the outlet is connected to the pipe line. The system comprises a four-way control valve connected between the vacuum pump and the pipe line and having two positions, one for vacuum operation of the milker units and the other for super-atmospheric operation of the currying device or other apparatus. Thus, not only does the milker vacuum pump provide the necessary pneumatic pressure for such other apparatus, but also the latter pressure is supplied through the same pipe line which serves the milker units. This feature is of particular importance as it enables the use of super-atmospheric pressure-operated apparatus at various locations near the milker pipe line extending through the barn, without requiring additional piping in the barn.

For a better understanding of the invention, reference may be had to the accompanying drawing, in which:

Fig. 1 is a schematic view of a milking system constructed in accordance with the invention, showing the control valve in position for vacuum milking, and;

Fig. 2 is a similar view showing the control valve in position for operating an apparatus from the pipe line under super-atmospheric pressure.

Referring to the drawing, the milking system comprises a vacuum pump 1, a pipe 2 connected at one end to the air outlet from the pump, and a pipe 3 connected at one end to the air inlet to the pump. The opposite end of each of the pipes 2 and 3 is connected to a control device in the form of a four-way valve 4 having a rotor $4^a$ and a stator $4^b$, the latter being provided with ports $4^c$, $4^d$, $4^e$ and $4^f$ leading to the rotor chamber at approximately 90° intervals. The rotor $4^a$ has diametrically opposed, peripheral recesses $4^g$ and $4^h$, each of which extends over an arc somewhat greater than 90° so that it can connect a pair of adjacent ports in the stator to the exclusion of the other ports.

The pipes 2 and 3 are connected to the diametrically opposed ports $4^c$ and $4^e$, respectively, in the stator, as by means of suitable adapters. Thus, the port $4^c$ serves as an air intake port, and the opposite port $4^e$ serves as an air escape port for the valve. The other ports $4^d$ and $4^f$, in turn, are connected respectively to the pipe line 5 of the milking system and a pipe 6 communicating with atmosphere. It will be understood that the pipe line 5 extends through the barn and is provided at intervals with stall cocks, such as the cock $5a$, by means of which a milking unit 7 may be connected to the line at the desired locations.

In the operation of the system, when it is desired to use the milker unit 7, the valve rotor $4^a$ is moved to the position shown in Fig. 1, wherein the ports $4^c$ and $4^f$ are interconnected through recess $4^g$, and the ports $4^d$ and $4^e$ are interconnected through recess $4^h$. Accordingly, when the pump 1 is driven, air will be evacuated from the pipe line 5 through ports $4^d$ and $4^e$, pipe 3, the pump, pipe 2, ports $4^c$ and $4^f$, and pipe 6 to the atmosphere. The pipe line 5 will therefore supply the necessary sub-atmospheric pressure for operating the milking unit 7.

Wen it is desired to use an apparatus requiring super-atmospheric pressure, such as a currying device 8, the valve rotor $4^a$ is moved to the position shown in Fig. 2, thereby connecting the port $4^c$ to port $4^d$, and the port $4^e$ to port $4^f$. In this position of the valve, when the pump 1 is driven, air will be forced into the pipe line 5 from the atmosphere through pipe 6, ports 4$^f$ and 4$^e$, pipe 3, the pump, pipe 2 and ports 4$^c$ and 4$^d$. Consequently, the pump 1 will now act as a compressor to supply by way of the pipe line 5 the necessary super-atmospheric pressure for the currying device 8. The latter may be connected to one of the stall cocks 5$a$ at the desired location and operated in the usual manner.

It will be apparent that I have provided a milking system which is extremely flexible in that it may be readily conditioned for either a vacuum milking operation of super-atmospheric operation of a secondary apparatus through the same pneumatic pipe line, by adjustment of valve 4. Also, milking systems of the type commonly used can, by a simple modification, be arranged in accordance with the invention so that their field of utility is considerably extended.

I claim:

In combination, a vacuum milker pipe line, a stall cock in said pipe line and connectible to a vacuum milker unit, a pressure currying device releasably connected to the stall cock, a vacuum pump having an air inlet and an air outlet, a valve stator having an atmospheric port, an air escape port connected to the pump inlet, an air intake port connected to the pump outlet, and a fourth port connected to said pipe line, and a valve rotor having recesses in the stator connecting said atmospheric port to said escape port and connecting said air intake port to said fourth port, to operate said device under super-atmospheric pressure from the pump outlet through the pipe line, said rotor being operable, upon rotation of the rotor, to connect said atmospheric port to said air intake port and connect said escape port to said fourth port, to create a vacuum in said pipe line for operation of the milker unit.

SVEN JOHAN ERLING.

REFERENCES CITED

The following references are of record in the file of this patent:

UNITED STATES PATENTS

| Number | Name | Date |
|---|---|---|
| 930,989 | Richards | Aug. 10, 1909 |
| 1,809,432 | Webb | June 9, 1931 |
| 2,037,467 | Hapgood | Apr. 14, 1936 |
| 2,397,855 | Grams | Apr. 2, 1946 |

FOREIGN PATENTS

| Number | Country | Date |
|---|---|---|
| 298,365 | Germany | June 18, 1917 |